US006766396B2

(12) United States Patent
Kutz

(10) Patent No.: US 6,766,396 B2
(45) Date of Patent: Jul. 20, 2004

(54) PC16550D UART LINE STATUS REGISTER DATA READY BIT FILTER AND LATCH

(75) Inventor: David Kutz, Scottsdale, AZ (US)

(73) Assignee: Lucent Technologies Inc., Murray Hill, NJ (US)

( * ) Notice: Subject to any disclaimer, the term of this patent is extended or adjusted under 35 U.S.C. 154(b) by 587 days.

(21) Appl. No.: 09/875,215

(22) Filed: Jun. 7, 2001

(65) Prior Publication Data

US 2003/0009611 A1 Jan. 9, 2003

(51) Int. Cl.[7] .......... G06F 13/42

(52) U.S. Cl. .......... 710/106; 710/105; 710/305; 710/52; 710/58; 710/62; 711/167

(58) Field of Search .......... 710/106, 105, 710/305, 52, 58, 62; 711/167; 311/109; 375/200

(56) References Cited

U.S. PATENT DOCUMENTS 3,621,468 A * 11/1971 Stechmann et al. .......... 331/109
4,651,113 A * 3/1987 Fujita .......... 331/109
5,140,679 A * 8/1992 Michael .......... 710/106
5,150,081 A * 9/1992 Goldberg .......... 331/109
5,291,609 A * 3/1994 Herz .......... 710/52
5,572,716 A * 11/1996 Meisner .......... 713/500
5,649,122 A * 7/1997 Wegner et al. .......... 710/105
5,822,548 A * 10/1998 Story et al. .......... 710/106
5,903,601 A * 5/1999 Elnashar et al. .......... 375/220
6,049,887 A * 4/2000 Khandekar et al. .......... 713/503
6,055,642 A * 4/2000 Ikemoto .......... 713/322
6,256,717 B1 * 7/2001 Inoue et al. .......... 711/167
6,332,173 B2 * 12/2001 Typaldos .......... 710/106
6,470,404 B1 * 10/2002 Kim .......... 710/63
6,516,362 B1 * 2/2003 Magro et al. .......... 710/58
6,546,442 B1 * 4/2003 Davis et al. .......... 710/106
6,654,816 B1 * 11/2003 Zaudtke et al. .......... 710/1
6,678,756 B1 * 1/2004 Tseng et al. .......... 710/52

OTHER PUBLICATIONS

Wilfried Elmenreich and Martin Delvai, "Time–Triggered Communication with UARTs", 2002, 4th IEEE International Workshop on Factory Communication Systems.*
H. Gilbert, "Do You Need a Better COM Port", 1995, http://www.yale.edu/pclt/COMISDN/16550.htm.*

* cited by examiner

*Primary Examiner*—Xuan M. Thai
*Assistant Examiner*—Justin King

(57) ABSTRACT

A circuit for use with a PC16550D UART in 16450 polling mode that will filter DR bit oscillations. The circuit latches the value of the Line Status Register during the valid data portion of a LSR register read cycle, deasserts the read strobe, delays to allow the data bus values to float, applies the latched values of the LSR to the data bus, then asserts a ready signal to the microprocessor. If the UART access is not a read cycle to the LSR, the delay time is bypassed and the UART access cycle proceeds normally.

2 Claims, 3 Drawing Sheets nUART_RS
KILL_RS
ULSR_IN
ULSR_OUT
READY
9
W_nR
ACW
ADDR
C
KRS
RDY
UIN
UOUT
R
8
U_CYC
W1
W2
W_nR
LSR_ADDR
U_ACCS
C

PC16550D UART LINE STATUS REGISTER DATA READY BIT FILTER AND LATCH

FIELD OF THE INVENTION

The present invention relates to the field of Universal Asynchronous Receiver/Transmitters (UARTs), and more particularly to a circuit that solves a problem with an oscillating bit in the Line Status Register of the PC16550D during polling operations.

BACKGROUND OF THE INVENTION

A Universal Asynchronous Receiver/Transmitter (UART) is an interface chip that, in one mode, receives an eight-bit byte of data from an I/O bus at high speed, then, at a much slower speed, transmits a start bit, the eight bits of data, and a stop bit to an external interface. In another mode, the UART receives a start bit, eight bits of data, and a stop bit one bit at a time over a serial interface until the entire data byte is assembled and the processor can then read the data byte from the chip.

All serial devices, such as serial modems, typically use a UART interface chip to communicate with a PC. External modems connect to a PC using a serial cable hooked to one of the PC's UART-based serial ports, while internal modems have a UART-based serial port on-board.

The UART standard is based on the National Semiconductor model NS16450 UART, which has a single character buffer. An improved version of the 16450 is the National Semiconductor model PC16550D UART, as described in datasheet "PC16550D Universal Asynchronous Receiver/Transmitter with FIFOs," June 1995, which is hereby incorporated by reference. The 16550 has a 16 byte FIFO receive/transmit buffer to reduce buffer overrun errors. Virtually all newer systems use 16550 or compatible UARTs.

The PC16550D provides two ways for the CPU to determine if a full character has been received from the serial interface. The first method uses an interrupt signal asserted on an external pin to alert the processor that a full character has been received. The processor then reads the character from the Receiver Buffer Register, which action resets the interrupt.

In the second method, the processor polls the Data Ready (DR) bit of the 16550 Line Status Register (LSR). When a full character has been read into the Receiver Buffer Register, the UART asserts the DR bit. On a subsequent poll, the processor reads the asserted DR bit and then reads the data byte, which action resets the DR bit. Due to its asynchronous nature, a processor poll of the DR bit may be initiated independent of where the UART is in a data byte read operation.

A problem was discovered with the PC16550D when using the polling mode of operation in 16450 mode wherein the DR bit, as asserted on the UART data bus during a LSR read operation, is observed to rapidly oscillate during the valid data interval. The underlying cause of the oscillation is unknown, however it is repeatable. Observation shows that the oscillation occurs when a read strobe signal is asserted to the UART at or right after a data byte read has completed. When signal RD is asserted approximately 15 nsec before signal RXRDY (active low) is asserted by the UART, the rapid oscillation is observed. In a test configuration where the read strobe is allowed to remain asserted, the oscillation was observed to continue for more than 4 microseconds. When the read strobe is deasserted, the oscillation ceases, and in particular does not continue beyond the read to floating delay interval.

Since the DR bit oscillation only occurs after a data byte read has completed, a poll of the DR bit will not indicate a false positive, but may indicate a false negative.

One problem that the oscillating DR bit can cause is a data bus parity error at the processor. When the data bus and the output of the parity checking circuit of the processor are latched into a register, the parity may not be in synchronization with the data bus values, leading to data bus parity error indications.

Another problem that the oscillating DR bit can cause is a system fault in systems having micro-synchronized microprocessors. If the two micro-synchronized microprocessors do not read the LSR register value from the UART data bus at exactly the same time, the oscillation may cause one of the microprocessors to read a different value of the oscillating DR bit than the other microprocessor, which will cause a system fault.

SUMMARY OF THE INVENTION

Accordingly, it is an object of the present invention to provide a circuit for use in conjunction with a PC16550D UART in 16450 polling mode that will filter out the DR bit oscillations and eliminate parity and micro-synchronization errors.

The invention of Applicant latches the value of the LSR during the valid data portion of a LSR register read cycle, then deasserts the read strobe, delays a sufficient time to allow the data bus values to float, and hence delays a sufficient time to allow the DR bit oscillations to end, applies the latched values of the LSR to the data bus, then asserts a ready signal to the microprocessor. If the UART access is not a read cycle to the LSR, the delay time to allow the data bus values to float is bypassed, and the UART access cycle proceeds normally.

DESCRIPTION OF THE PREFERRED EMBODIMENT

Figure 1:
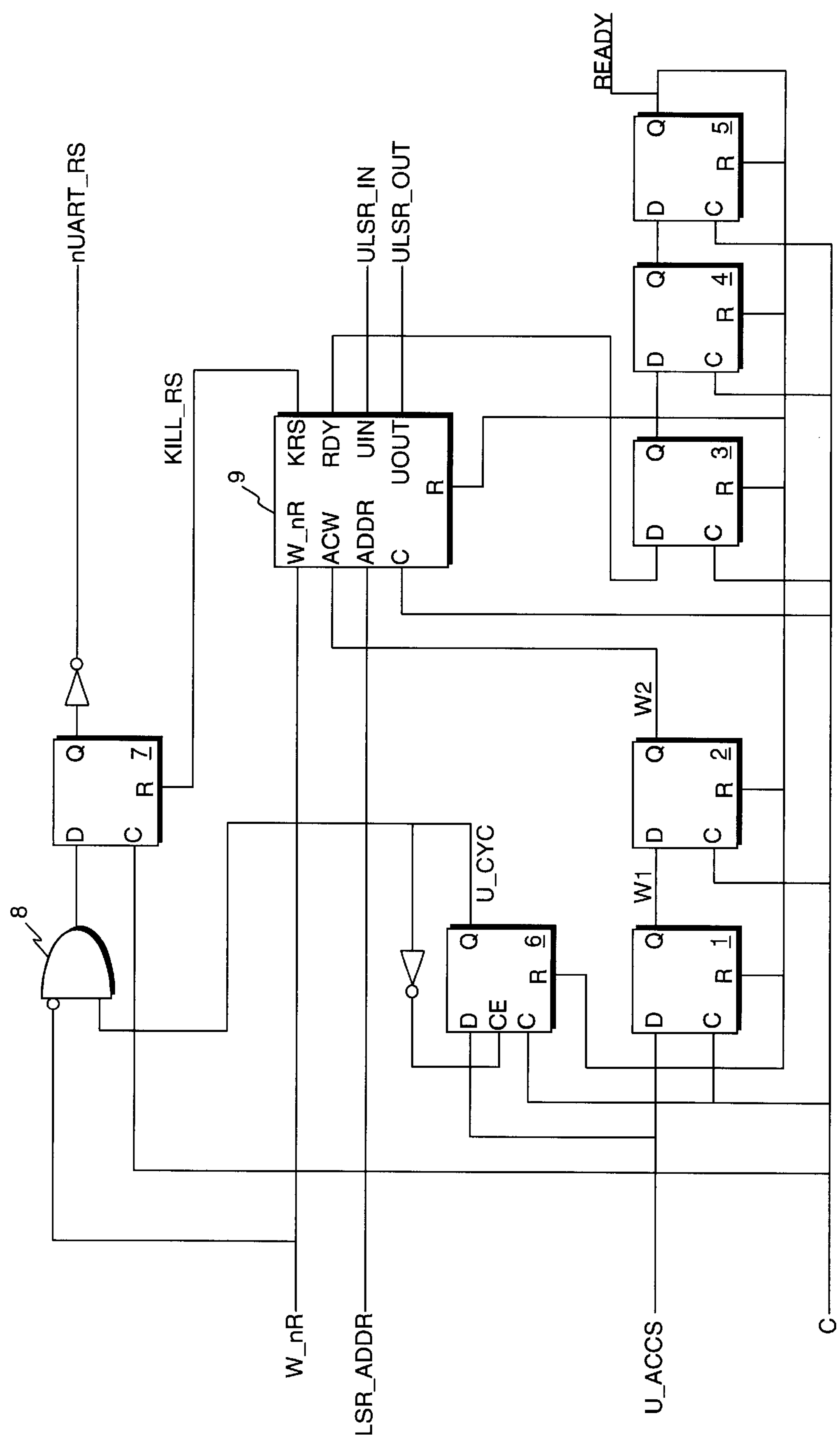
FIG. 1 shows a schematic of a preferred embodiment of the present invention.

FIG. 1 shows a circuit schematic of a preferred embodiment of the present invention. The circuit works in conjunction with a PC16550D UART, a microprocessor that accesses the UART for, among other things, an LSR read function, and some additional circuitry preferably in an FPGA that performs a read and latch data from UART data bus function, and a write to UART data bus function, none of which is shown nor described here in detail. The invention includes two state machines, each D-type flip-flop based and using one-hot encoding. The first state machine comprises flip-flops 1 to 5. The second state machine is part of UART filter 9. External clock signal C, a 25 MHz signal (40 nanosecond cycle) in the preferred embodiment, drives all flip-flops in the circuit. A synchronous reset signal, driven by the Q output signal of flip-flop 5, resets all flip-flops in the circuit with the exception of flip-flop 7.

The input signals to the circuit are as follows. Read/write request signal W_nR from the microprocessor is active low for any microprocessor read access. UART chip select signal U_ACCS indicates that a microprocessor read or write access cycle to this UART has started. Register select signal LSR_ADDR is asserted if the register access is directed to the Line Status Register of the UART. Signals U_ACCS and LSR_ADDR typically result from chip select and register address decoding circuitry, not shown. Clock signal C is a 25 MHz clock signal.

The output signals of the circuit are as follows. nUART_RS is the active low read data signal to the UART. UART Latch Status Register In signal ULSR_IN indicates to the FPGA to latch the values on the UART data bus into a latch register, not shown. UART Latch Status Register Out signal ULSR_OUT indicates to the FPGA to assert the latched UART data bus values onto the UART data bus. Ready signal READY indicates to the microprocessor that the values on the UART data bus are ready to be read. Asserting the Q output signal of flip-flop 5 results in a reset of all flip-flops in the circuit, with the exception of flip-flop 7, on the next rising clock edge.

Figure 3:
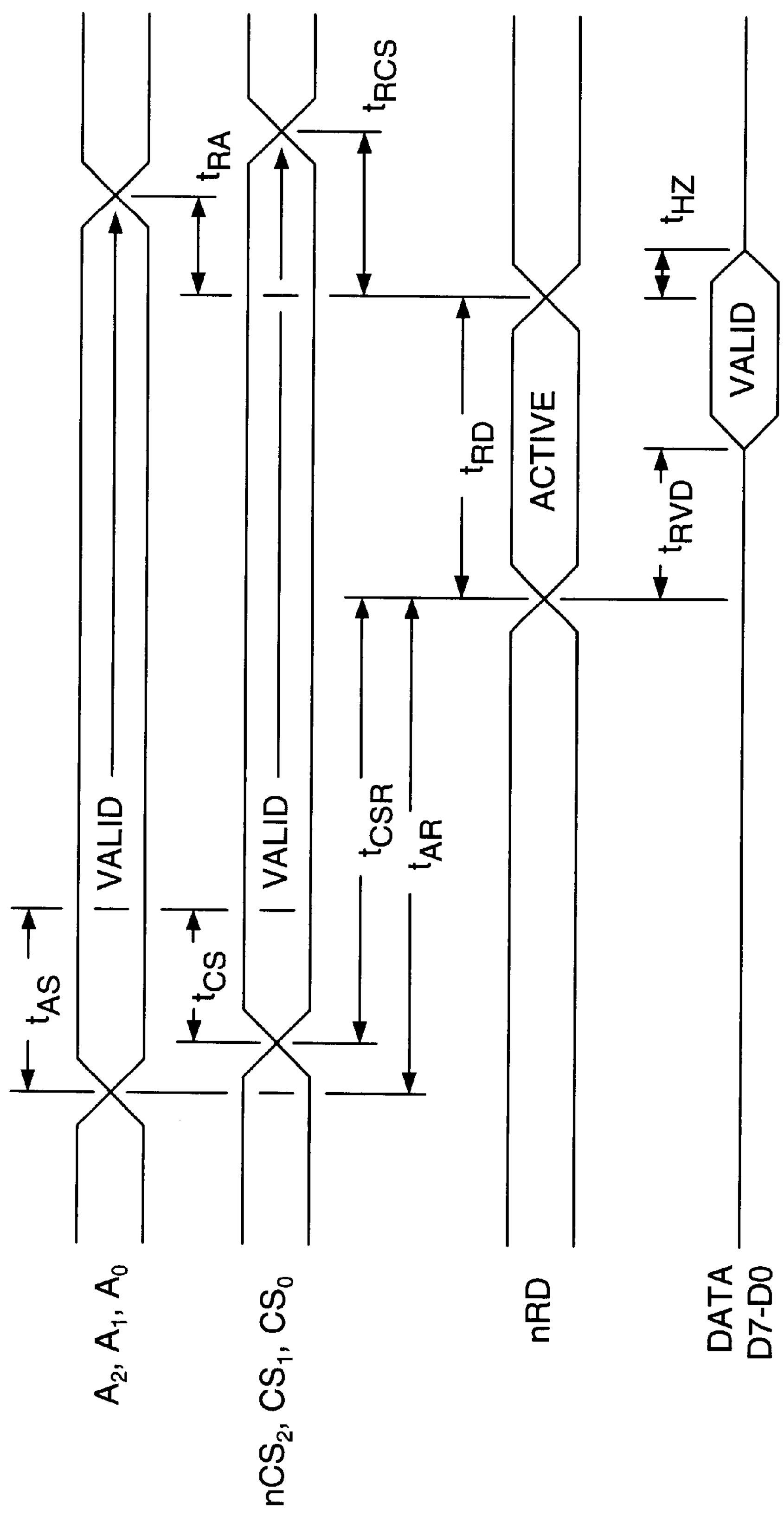
FIG. 3 shows a copy in pertinent part of the read cycle timing diagram of the PC16550D UART.

A signal timing diagram for the PC16550D signals pertinent to the present invention is shown in FIG. 3 and is described in detail below. In overview, register select and chip select signals $A_2$, $A_1$, $A_0$ and $nCS_2$, $CS_1$ and $CS_0$, which correspond to signals LSR_ADDR and U_ACCS, respectively, are asserted approximately coincident with each other, and remain asserted until a certain interval after signal nRD, which corresponds to read strobe signal nUART_RS, is deasserted. After signals LSR_ADDR and U_ACCS are asserted, a certain interval is required before signal nRD can be asserted. Signal nRD must remain asserted for a certain minimum interval. Line status register data is asserted and valid on the UART data bus a certain interval after signal nRD is asserted. Values on the UART data bus will float a certain interval after signal nRD is deasserted.

In operation, all flip-flops are initially in a low state. Chip select signal U_ACCS and LSR select signal LSR_ADDR are asserted approximately coincident with each other. These signals remain asserted for the duration of the LSR read cycle. Signal U_ACCS causes flip-flop 6 to assert signal U_CYC on its D output to one lead of AND gate 8. Signal W_nR is asserted low on the other lead of AND gate 8 approximately coincident or shortly after signals LSR_ADDR and U_ACCS, resulting in flip-flop 7 asserting signal nUART_RS. Flip-flop 6 assures at least a one cycle delay after signal U_ACCS before signal nUART_RS is asserted low, which is sufficient to satisfy the read delay from chip select and the read delay from register select intervals ($t_{CSR}$ and $t_{AR}$ respectively on FIG. 3) of the PC16550D. A negative feedback loop on flip-flop 6 disables its clock enable input when signal U_CYC is asserted.

When signals LSR_ADDR, W_nR and the delayed U_ACCS signal via W2 are all asserted, the state machine of UART filter 9 starts. UART filter 9 is illustrated in detail in FIG. 2 and described below. In overview, UART filter 9 waits a sufficient interval after signal nUART_RS is asserted to allow the LSR data on the UART data bus to become valid. UART filter 9 then asserts the signal ULSR_IN, causing the data on the UART data bus to be latched, and also asserts signal KILL_RS, causing signal nUART_RS of flip-flop 7 to go high, which in turn deasserts the read strobe of the UART. UART filter 9 then waits a sufficient time to allow the values on the UART data bus to float, then asserts signal ULSR_OUT, causing the latched data bus values to be asserted on the UART data bus, and also asserts output signal RDY, resulting in signal READY of flip flop 5 to be asserted three clock cycles later, via flip-flops 3 to 5, which signals the processor to read the UART data bus.

The problem of the oscillating DR bit on the UART data bus occurs only during the interval when the UART is asserting values on the data bus. The present invention overcomes this problem by latching the LSR data bus values during the interval when the UART is asserting values on the data bus, killing the read strobe and waiting until the data bus values float, asserting the latched LSR values onto the UART data bus, and signaling the processor to read the now stable data bus values. As stated above, the DR bit only oscillates when a character has been received into the UART Receiver Buffer register, so a false positive DR bit is not possible, but a false negative is. If the latched data bus values contain a false negative DR bit value, a subsequent poll of the PC16550D will result in the correct DR bit value.

Figure 2:
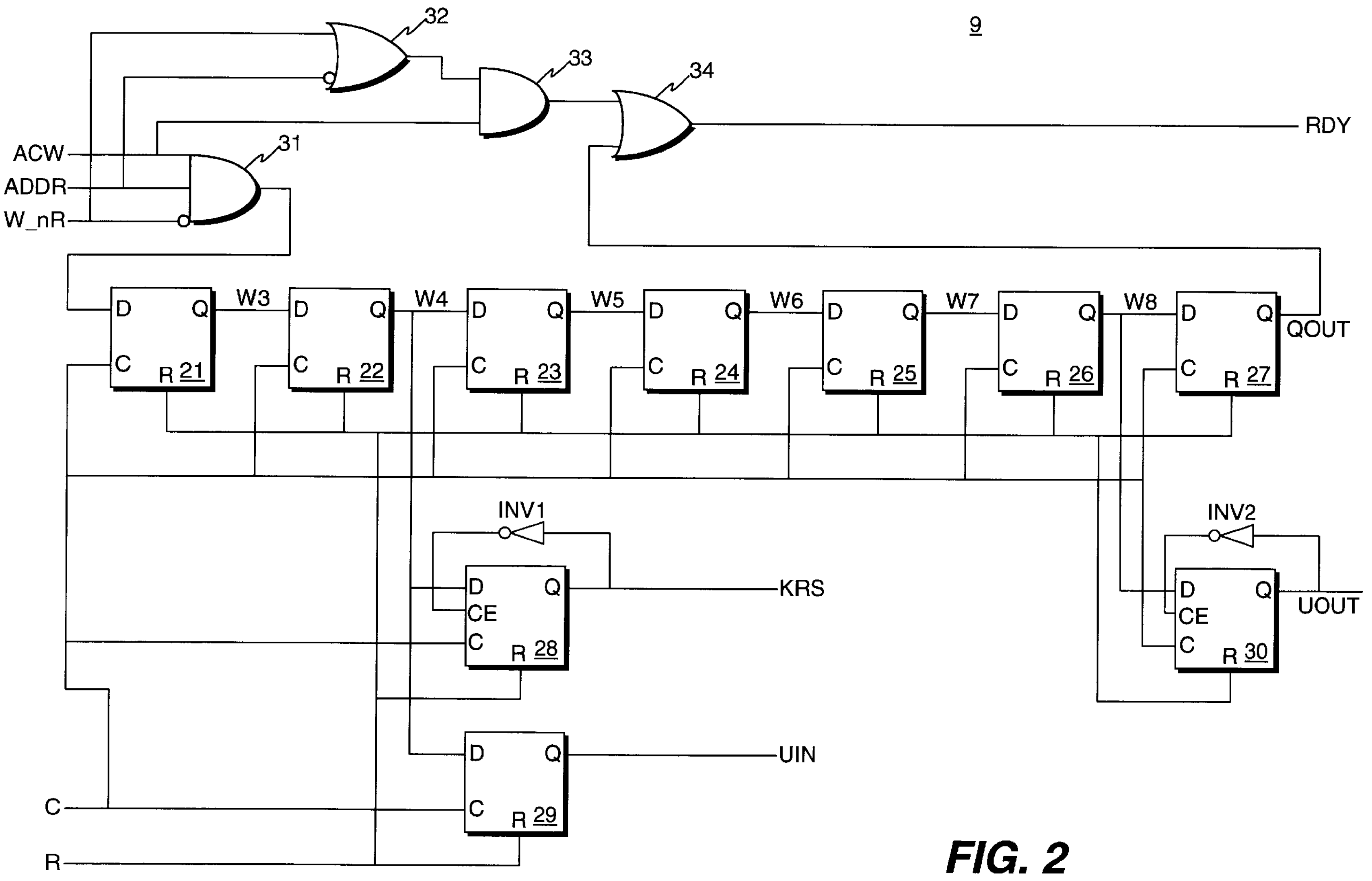
FIG. 2 shows a schematic of a preferred embodiment of the UART filter state machine of the present invention.

FIG. 2 shows a schematic of a preferred embodiment of the UART filter 9 state machine of the present invention. When signals ACW, ADDR and W_nR are asserted at AND gate 31, this indicates a read access to the LSR for the UART, and the output of AND gate 31 is asserted on the D input of flip-flop 21. Flip-flops 21-27 form a chain that controls the timing and states of UART filter 9. Flip-flops 2, 21, 22 and 28 in combination with flip-flop 7 introduce a delay corresponding to read strobe width $t_{RD}$ before signal KRS, corresponding to signal KILL_RS on FIG. 1, is asserted on the reset lead of flip-flop 7, causing UART read data signal nUART_RS to be deasserted on the next leading clock edge. A negative feedback loop on flip-flop 28 disables its clock enable input when signal KRS is asserted. Flip-flops 2, 21, 22 and 29 introduce a delay corresponding to delay from read to data interval $t_{RVD}$ before signal UIN, corresponding to UART Latch Status Register In signal ULSR_IN of FIG. 1, is asserted.

Flip-flops 24–27 introduce a delay corresponding to read to floating data delay interval $t_{HZ}$ of FIG. 3. Coincident with flip-flop 27 going high, flip-flop 30 also goes high, by virtue of signal W8 from flip-flop 26, and asserts signal UOUT. Signal UOUT corresponds to signal ULSR_OUT of FIG. 1, and indicates to the FPGA to assert the latched values onto the UART data bus to be read by the microprocessor.

Coincident with signal UOUT, signal QOUT from flip-flop 27 is asserted on one of the inputs to OR gate 34, causing signal RDY to be asserted. Signal RDY is asserted on the D input lead of flip-flop 3, causing signal READY of flip-flop 5 to be asserted three clock cycles later, indicating to the processor to read the UART data bus values.

If signal ACW is asserted, indicating a read/write access to the UART, and either signal ADDR is not asserted, indicating the address to be accessed is not the LSR, or ADDR is asserted and signal W_nR is high, indicating a write access to the LSR, OR gate 32 and AND gate 33 cause a signal to be asserted to the top lead of OR gate 34, which in turn causes the RDY output of UART filter 9 to be asserted. In these cases, the problem with the oscillating DR bit is not experienced, and the delay introduced in reading values on the UART data bus is not required. When the signals corresponding to chip access, register select and a read signal are received at UART filter 9, signal RDY is asserted, thus bypassing the delay processing controlled by flip-flop chain 21–27.

FIG. 3 shows a copy in pertinent part of the read cycle timing diagram for the PC16550D UART. A summary of the signal descriptions is as follows:

Register Select signal A2, A1, A0, selects a UART register for the processor to read from or write to during data transfer. In the present invention, when the Line Status Register is selected, signal LSR_ADDR is asserted.

Chip Select signal nCS2, CS1, CS0 selects the specific chip. In the present invention, when this UART is selected, signal U_ACCS is asserted.

Register Read signal nRD (active low) indicates a read access to a UART register is desired. When nRD is asserted while the chip is selected, the CPU can read information from the UART register addressed by the Register Select signal. In the present invention signal nUART_RS corresponds to signal nRD.

Data Bus signal DATA provides bidirectional communications between the UART and the CPU via an 8-bit bus.

Table 1 summarizes in pertinent part the timing characteristics important to the present invention, and that are indicated in FIG. 3. In the present invention, the pin for signal nADS is tied low.

TABLE 1

AC Electrical Characteristics

| Symbol | Parameter | Conditions | Min | Max | Units |
|---|---|---|---|---|---|
| $t_{AR}$ | nRD Delay from Register Select | (Note 1) | 30 | | ns |
| $t_{AS}$ | Address Setup Time | | 60 | | ns |
| $t_{CS}$ | Chip Select Setup Time | | 60 | | ns |
| $t_{CSR}$ | nRD Delay from Chip Select | (Note 1) | 30 | | ns |
| $t_{HZ}$ | nRD to Floating Data Delay | @100 pF Loading (Note 3) | 0 | 100 | ns |
| $t_{RA}$ | Register Address Hold Time from nRD | (Note 1) | 20 | | ns |
| $t_{RCS}$ | Chip Select Hold Time from nRD | (Note 1) | 20 | | ns |
| $t_{RD}$ | nRD Strobe Width | | 125 | | ns |
| $t_{RVD}$ | Delay from nRD, to Data | @100 pF Loading | | 60 | |

Note 1: Applicable only when nADS is tied low.
Note 3: Charge and Discharge time is determined by $V_{OL}$, $V_{OH}$ and external loading.

While a preferred embodiment of a PC16550D UART Line Status Register Data Ready bit filter and latch has been particularly shown and described, it is not intended to be exhaustive nor to limit the invention to the embodiment disclosed. Any suitable method and technology may be used such that the timing relationship of the chip select, register address, and UART read signals are satisfied, UART data bus values are latched during the valid data interval, the latched values are asserted on the bus when the bus floats after the read cycle, and a ready signal is transmitted to the processor. It will be apparent to those skilled in the art that modifications can be made to the present invention without departing from the scope and spirit thereof. For example, implementation details that affect the upstream processing to produce signals W_nR, LSR_ADDR and U_ACCS, and downstream processing of signals ULSR_IN, ULSR_OUT and READY with regard to their timing may require specific changes to the preferred embodiment, such as, for example, generating signal READY from the Q output of flip-flop 3 so as to allow for a two cycle downstream processing delay. Also, the preferred embodiment may be implemented as discrete components or as a programmable logic device, such as a field programmable gate array. Also, although the preferred embodiment comprises D-type flip-flops and AND and OR logic gates, any suitable storage device and logic gate technology may be used. Also, although the preferred embodiment uses a 25 MHz clock signal, any suitable clock signal may be used that will allow storage device chains of a length that will satisfy the delay interval requirements of the PC16550D UART. Also, although the preferred embodiment uses storage device chains of various lengths to introduce delay intervals, any suitable technology may be used to introduce delay intervals so long as the technology allows for delay intervals that will satisfy the delay interval requirements of the PC16550D UART. It is intended that the scope of the invention be defined by the claims appended hereto and their equivalents.

What is claimed is:

1. A method to overcome a National Semiconductor PC16550D Universal Asynchronous Receiver/Transmitter (UART) Line Status Register (LSR) Data Ready bit oscillation problem, a UART having a Line Status Register, and the UART receiving a UART register select signal, a UART chip select signal and a UART read signal, and transmitting a UART data bus signal, said signals operating in a timed relationship in accordance to a read delay from chip select, read delay from register select, read strobe width, delay from read to data, and read to floating data delay, said method comprising:

receiving a LSR register select signal indicating that said UART register select signal selects said Line Status Register;

receiving a chip select signal approximately coincident with said LSR register select signal, and indicating said UART chip select signal selects said UART;

receiving a read request signal indicating a read operation is requested;

waiting an interval after receiving said LSR register select signal and said chip select signal that is at least as long as said read delay from chip select and said read delay from register select;

transmitting said UART read signal;

waiting an interval after said transmitting said UART read signal that is at least as long as said read strobe width;

transmitting a kill read strobe signal;

waiting an interval after said transmitting said UART read signal that is at least as long as said delay from read to data, after which interval said UART data bus signal is transmitting valid data;

transmitting a latch UART data bus values signal;

waiting an interval after said transmitting a kill read strobe signal that is at least as long as said read to floating data delay;

transmitting a write latched UART data bus values to UART data bus signal; and transmitting a ready signal.

2. A method according to claim 1, after said waiting an interval after receiving said LSR register select signal and said chip select signal, further comprising:

if it is determined that said chip select signal indicates that said UART is selected, and said LSR register select signal does not indicate that said Line Status Register is selected, or said read request signal does not indicate a read operation, then transmitting said ready signal.

* * * * *